No. 749,592. PATENTED JAN. 12, 1904.
S. L. TREEN.
COOKING UTENSIL.
APPLICATION FILED JUNE 15, 1903.
NO MODEL.
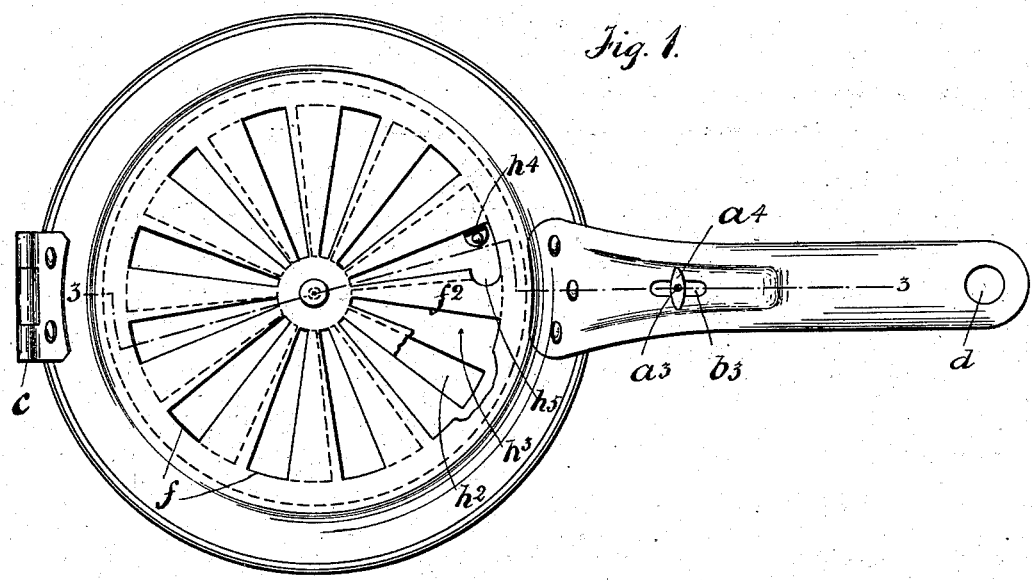
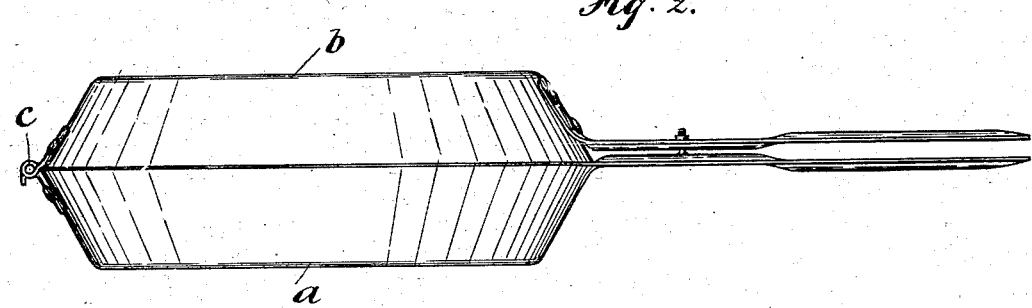
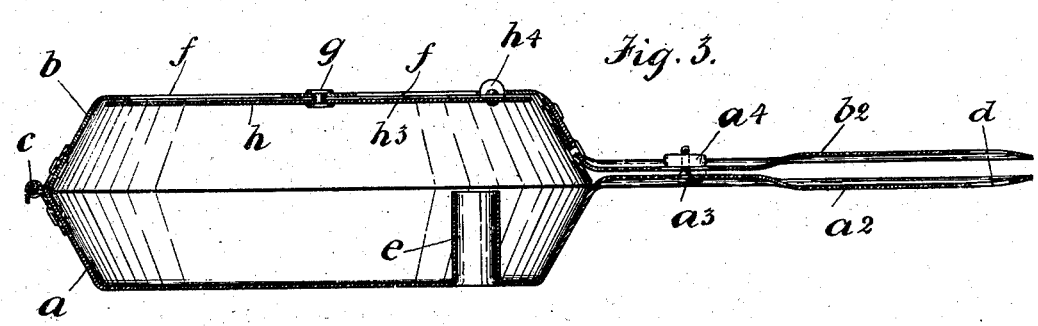
WITNESSES
Eric Tidestrom
F. A. Stewart
INVENTOR
Stephen L. Treen
BY
Edgar Tate & Co
ATTORNEYS No. 749,592. Patented January 12, 1904.

UNITED STATES PATENT OFFICE.

STEPHEN L. TREEN, OF JERSEY CITY, NEW JERSEY.

COOKING UTENSIL.

SPECIFICATION forming part of Letters Patent No. 749,592, dated January 12, 1904.

Application filed June 15, 1903. Serial No. 161,421. (No model.)

*To all whom it may concern:*

Be it known that I, STEPHEN L. TREEN, a citizen of the United States, residing at Jersey City, in the county of Hudson and State of New Jersey, have invented certain new and useful Improvements in Cooking Utensils, of which the following is a specification, such as will enable those skilled in the art to which it appertains to make and use the same.

The object of this invention is to provide an improved cooking utensil which may be used as a stew-pan, frying-pan, broiler, and for other and similar purposes; and with this and other objects in view the invention consists in a device of the class specified constructed as hereinafter described and claimed.

The invention is fully disclosed in the following specification, of which the accompanying drawings form a part, in which the separate parts of my improvement are designated by suitable reference characters in each of the views, and in which—

Figure 1 is a plan view of my improved cooking utensil; Fig. 2, a side view thereof, and Fig. 3 a section on the line 3 3 of Fig. 1.

In the practice of my invention I provide a cooking utensil of the class specified, which comprises a bottom member $a$ and a similar top member $b$, both of which are preferably circular in plan view or horizontal section and both of which are also substantially dish-shaped in form. The parts $a$ and $b$ are hinged together at $c$, and this hinge is preferably so made that the parts may be disconnected and opposite the hinge $c$. The parts $a$ and $b$ are provided each with a handle member $a^2$ and $b^2$, respectively.

The handle member $b^2$ of the part $b$ is preferably provided with a slot $b^3$, and secured in the handle member $a^2$ is a pin $a^3$, adapted to turn therein, and this pin is provided with a knob or button $a^4$, which is adapted to pass through the slot $b^3$ and by means of which the handle members may be secured together, if desired, and each of the handle members is also provided with a transverse opening $d$, whereby the cooking utensil when not in use may be suspended from a hook or other support.

The bottom member $a$ is provided, preferably near one side thereof, with an upwardly-directed tubular member $e$, which is preferably about the same height as the depth of said bottom member $a$ of the device and which opens downwardly through said bottom member, and the top member $b$ is provided with radial slots or openings $f$, and pivoted centrally of the top member $b$ at $g$ is a disk $h$, having corresponding radial slots or openings $h^2$, by means of which radial arms $h^3$ are formed, and the disk $h$ is adapted to be turned so as to close the radial slots or openings $f$ in the part $b$ or open the same, as may be desired. Secured to one of the radial arms or members $h^3$ of the disk $h$ is a lug or projection $h^4$, and one of the radial members $f^2$ between the slots or openings $f$ in the part $b$ is provided with a recess $h^5$, adapted to receive the lug or projection $h^4$ when the disk $h$ is turned so as to open the top of the part $b$.

When it is desired to use this device as a stew-pan or frying-pan, the material is placed in the bottom part $a$ and the part $b$ is closed thereover, and the device is placed on a stove or over an opening in a stove or range, and the register in the top of the part $b$ is closed, and any fumes or odors arising from the cooking food pass out through the short tube $e$ into the stove or range. If the device is intended for use as a broiler, the registering device is open and the meat to be broiled is placed in the part $b$ and the broiler is held over the fire in the usual manner or supported thereon or thereover in any desired way, and in this use of the device the odors or fumes also pass out through the tube $e$ and escape through the ventilating device of the stove or range.

It will be observed that the parts $a$ and $b$ are formed flat, except the perimeters or flanges thereof, and by reason of this formation the device will rest evenly on a stove or range or on a gridiron or similar device or support, and the perimeter of the part $b$ is preferably so formed as to fit within the perimeter of the part $a$ at their adjacent edges, so as to make the utensil tight when in use.

Having fully described my invention, what I claim as new, and desire to secure by Letters Patent, is—

1. A cooking utensil of the class described, comprised of top and bottom portions dish-shaped in form and hinged together at one side and provided each with a handle member at the opposite side, one of said parts being provided with radial slots or openings and with a disk pivoted centrally thereof and similarly formed, substantially as shown and described.

2. A cooking utensil of the class described, comprised of top and bottom portions dish-shaped in form and hinged together at one side and provided each with a handle member at the opposite side, one of said parts being provided with radial slots or openings and with a disk pivoted centrally thereof and similarly formed, and the other part being provided with a tube which opens therethrough, substantially as shown and described.

In testimony that I claim the foregoing as my invention I have signed my name, in presence of the subscribing witnesses, this 13th day of June, 1903.

STEPHEN L. TREEN.

Witnesses:
F. A. STEWART,
C. E. MULREANY.